United States Patent [19]

Griffin

[11] 4,044,099
[45] Aug. 23, 1977

[54] POLLUTED AIR EFFLUENT INCINERATING METHOD

[75] Inventor: Lawrence C. Griffin, Seattle, Wash.

[73] Assignee: Griffin Research & Development, Inc., Miami, Fla.

[21] Appl. No.: 688,355

[22] Filed: May 20, 1976

Related U.S. Application Data

[62] Division of Ser. No. 397,947, Sept. 17, 1973, Pat. No. 3,960,504.

[51] Int. Cl.² .......................... A61L 9/00; F23G 7/06
[52] U.S. Cl. .................................................. 423/210
[58] Field of Search ............. 23/277 C; 431/183, 353; 110/8 A; 432/72; 34/72; 423/210, 224

[56] References Cited

U.S. PATENT DOCUMENTS

| | | | |
|---|---|---|---|
| 3,073,684 | 1/1963 | Williams, Sr. | 23/277 C |
| 3,076,497 | 2/1963 | Robb | 431/183 X |
| 3,090,675 | 5/1963 | Ruff et al. | 23/277 C |
| 3,276,693 | 10/1966 | Wolfersperger | 431/3 X |
| 3,311,456 | 3/1967 | Denny et al. | 23/277 C |
| 3,337,455 | 8/1967 | Wilson et al. | 23/277 C X |
| 3,368,605 | 2/1968 | Reed | 431/353 |
| 3,484,189 | 12/1969 | Hardison et al. | 23/277 C X |
| 3,526,081 | 9/1970 | Kusters | 23/277 C UX |
| 3,549,333 | 12/1970 | Tabak | 23/277 C |
| 3,658,482 | 4/1972 | Evans et al. | 23/277 C |
| 3,754,869 | 8/1973 | Raden | 23/277 C |
| 3,794,459 | 2/1974 | Meenan | 23/277 C X |
| 3,806,322 | 4/1974 | Tabak | 23/284 X |

FOREIGN PATENT DOCUMENTS 631,736   12/1927   France .............................. 23/277 C Primary Examiner—Morris O. Wolk
Assistant Examiner—Arnold Turk
Attorney, Agent, or Firm—Graybeal, Barnard & Uhlir

[57] ABSTRACT

A method of direct flame incineration of a polluted air effluent, such as the effluent from a coffee roasting oven. The method is employed in apparatus comprising a cylindrical housing containing three concentric longitudinally aligned shells, each of which defines a respective combustion zone, and with the outermost shell defining with the housing an effluent heat exchange passageway to receive the effluent from an effluent inlet. A fuel gas or oil nozzle directs a spray of fuel forwardly into the first innermost shell, with primary air also flowing into the first shell to provide initial combustion of the resulting air-fuel mixture. The effluent flowing from the heat exchange passageway flows partly through an annular secondary inlet into the combustion zone of the second intermediate shell, and partly through an annular tertiary passageway into the final combustion zone of the third outermost shell. The combustion products from the final combustion zone pass out an exhaust stack essentially as carbon dioxide and water.

6 Claims, 3 Drawing Figures

POLLUTED AIR EFFLUENT INCINERATING METHOD

CROSS-REFERENCE TO RELATED APPLICATION

This application is a divisional application of U.S. application Ser. No. 397,947, filed Sept. 17, 1973, and issuing June 1, 1976, as U.S. Pat. No. 3,960,504.

BACKGROUND OF THE INVENTION

1. Field of the Invention

The present invention relates to the removal of pollutants from air by direct flame incineration, and to a method for accomplishing the same.

2. Description of the Prior Art

In the operation of various types of processing plants, where a polluted air effluent is discharged into the atmosphere, a common method for removal of such pollutants is direct flame incineration. A typical example of such air contaminating effluent is that which is discharged from a conventional coffee roasting oven. The effluent from a coffee roaster is air carrying particulate matter and a variety of gaseous organic compounds, such as esters, aldehydes, ketones, and acids. With effective direct flame incineration, these organic pollutants can be oxidized to form carbon dioxide and water, which with the effluent air can then be discharged harmlessly into the atmosphere.

The prior art attempts at direct flame incineration have encountered various problems. In some instances, the heat transmitted from the incinerating apparatus to adjacent structure has been sufficiently high to create a fire hazard. Often this requires quite bulky installations of refractory material which adds considerably to the weight of the apparatus. Another problem with many of the prior art incinerating devices is that the apparatus is of sufficient complexity that the cost of initial installation and also the cost of maintenance are undesirably high. Yet another problem with some prior art devices is the unnecessarily high consumption of fuel needed to obtain proper incineration; also most such prior art devices are limited in the kind of fuel required, in that natural gas must be used to get adequate combustion.

One prior art incinerating device is shown in Tabak U.S. Pat. No. 3,549,333. In the Tabak patent, there is shown an incinerating apparatus having a burner which utilizes a portion of the effluent to be incinerated and mixes this with a fuel to provide initial combustion. Downstream of the burner, there is a second flow of effluent which mixes with the flame from the burner. To provide sufficient time, temperature and turbulence for adequate combustion, the Tabak device utilizes a rather elongate combustion section downstream from the end of the burner so that there can be substantially complete oxidation of the effluent.

Examples of several other prior art combustion devices are disclosed in the following U.S. Pat.: Ruff et al., U.S. Pat. No. 3,090,675; Leistritz, U.S. Pat. No. 3,254,963; Wolfersperger, U.S. Pat. No. 3,276,693; Beasley, U.S. Pat. No. 3,560,165; and Reed, U.S. Pat. No. 3,368,605.

In view of the prior art, it is an object of the present invention to provide a direct flame incinerating apparatus and method, adapted for use in incinerating an effluent, such as that discharged from a coffee roasting oven, but not limited thereto, wherein there is a desirable balance of such features as high operating efficiency, substantially complete pollutant oxidation, structural simplicity and compactness, and ease of operation and maintenance.

SUMMARY OF THE INVENTION

Typical apparatus for practice of the present invention, comprises a housing having shell means defining an outer annular effluent heat exchange passageway and a combustion area within the heat exchange passageway. In the preferred form, the combustion area is defined by three generally concentric shells defining, respectively, first, second and third combustion zones. Primary air and fuel are directed into the first zone defined by the inner shell to provide initial combustion. Further, there is an annular secondary air inlet and an annular tertiary air inlet, with the flow of polluted air effluent from the heat exchange passageway supplying the flow of air through both the secondary and tertiary inlets, into the second and third combustion zones, respectively, with the exhaust from the third combustion zone passing out an outlet stack as a pollutant free discharge.

In the preferred form, the tertiary air inlet is formed as an annular passageway between the two outer shells to provide additional heat exchange of the tertiary effluent flow. Desirably this tertiary passageway is provided by forming an overlap between the rear portion of the outermost shell with the forward portion of the intermediate shell. Also in the preferred from vanes are provided for both the primary air and the tertiary air to provide a counter-swirling flow to the primary and tertiary air for increased turbulence to improve combustion.

In operation, fuel is directed into the first combustion zone, along with an inflow of primary air, provided in the preferred form under pressure by a fan, with the fuel and primary air mixture providing initial combustion in the first zone. Desirably the flow of fuel and primary air is fuel rich, with the rate of primary air flow being approximately half that needed to accomplish complete combustion of the fuel. A secondary flow, in the form of a portion of the polluted air effluent, enters through the secondary annular passageway into the second combustion zone flowing generally coaxially and intermixing with the reacting fuel primary air mixture traveling forwardly into the second combustion zone. Desirably the rate of flow of secondary air is adequate to accomplish substantially complete combustion of the unreacted fuel. Downstream of the second combustion zone, there is a tertiary air flow in the form of the remainder of the polluted air effluent which flows into the third combustion zone in a generally coaxial direction and intermixing with the fuel-primary and secondary air reacting mixture. In the third combustion zone substantially complete oxidation of the fuel and the pollutants in the effluent takes place, with substantially clean exhaust being discharged from the outlet stack of the apparatus.

Other features of the present invention will become apparent from the following detailed description.

DESCRIPTION OF THE PREFERRED EMBODIMENT

The preferred embodiment of the present invention is described below in a practical application of processing the effluent of a coffee roasting oven. However, it is to be understood that the present invention can be used for processing other types of effluent.

Figure 1:
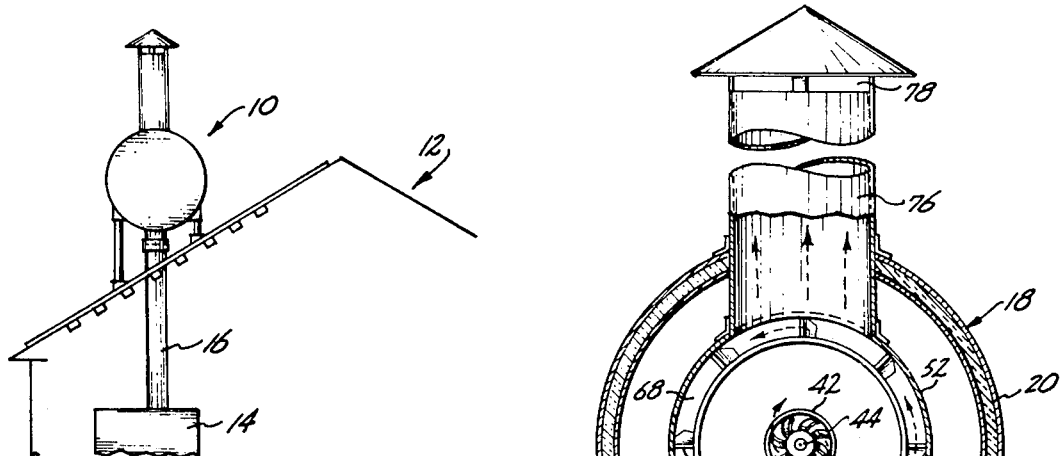
FIG. 1 is an elevational view, partly in section, illustrating apparatus employed in practice of the present invention, mounted on the roof of a processing plant.

In FIG. 1, the incinerating apparatus employed in practice of the present invention, generally designated 10, is shown mounted to the roof of a processing plant 12 and arranged to receive the effluent from a coffee roasting oven, indicated at 14. The effluent from the oven 14 rises through a conduit 16 into the incinerating apparatus 10, which in turn discharges substantially pollution free exhaust into the atmosphere.

Figure 3:
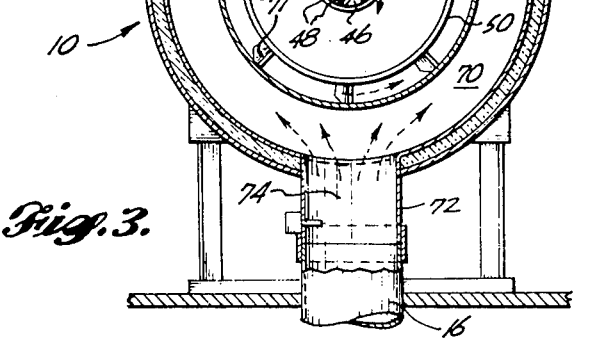
FIG. 3 is a transverse sectional view taken along lines 3—3 of FIG. 2.
Figure 2:
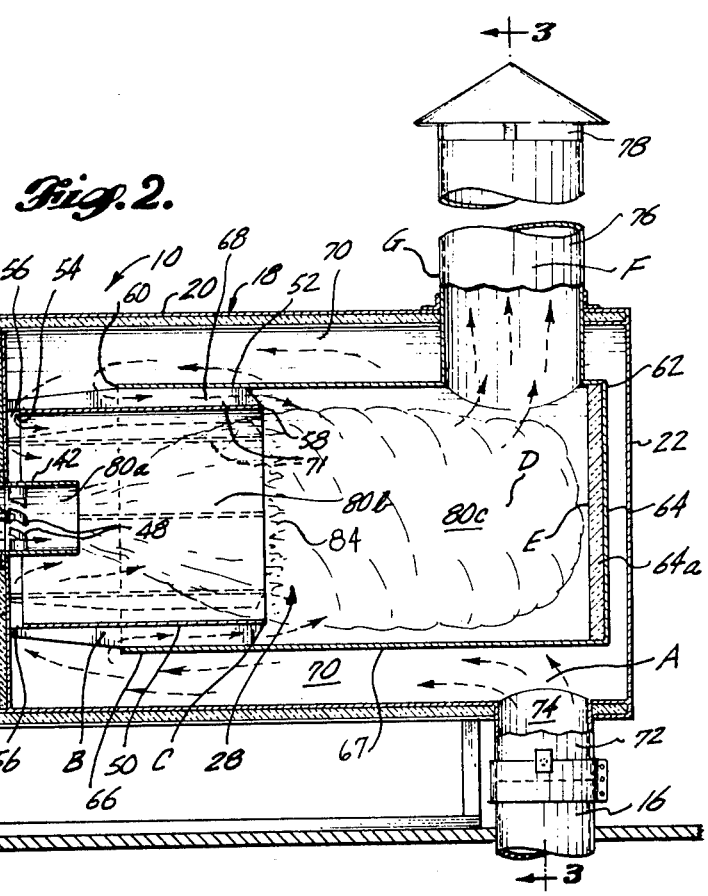
FIG. 2 is a longitudinal sectional view of the apparatus shown in FIG. 1.

With reference to FIGS. 2 and 3, the apparatus 10 comprises a cylindrical housing 18 made up of an insulated cylindrical side wall 20 closed by a front wall 22 and a rear cover 24 which is removable to provide access. At the rear of the housing 18, there is an insulated transverse partition 26 which divides the housing 18 into a forward processing section 28 and a rear control section 30. A burner unit 32 is mounted to the partition wall 26 at the center axis of the housing 18, by means of a flange 34, with the discharge end of the burner 32 being directed forwardly toward the processing section 28. The burner is provided with suitable fuel controls, these being located in the housing control section and indicated at 36. Also there is in the control section a fan 38 which supplies primary air under pressure to the burner 32 for combustion of the fuel. A screened air intake opening 40 is provided at the bottom of the housing 18 at the location of the chamber 30. Ambient air flows through the intake opening 40 and upwardly through the chamber 30 into the fan 38 to maintain the temperature in the chamber 30 at a moderate level (e.g. slightly more than 100° F.) and also to supply primary combustion air to the burner 32.

Connected to and extending forwardly from the burner 32 is a cylindrical shell 42, having its longitudinal center axis aligned with the longitudinal center axis of the housing 18. Located at the rear of the shell 42 is a fuel nozzle 44 of the burner 32, which sprays fuel forwardly in a diverging pattern into the area within the shell 42. Positioned around the nozzle 44 is an annular primary air inlet passage 46, in which is disposed a plurality of vanes 48. Air from the fan 38 is directed forwardly through the passage 46 into the combustion area defined by the shell 42. As can best be seen in FIG. 3, these vanes 48 are slanted in a manner that the primary air passing by the vanes 48 is given a swirling motion with respect to the longitudinal center axis of the burner 32, which in the view of FIG. 3 is a clockwise swirling motion. Initial combustion of the fuel-air mixture provided from the nozzle 44 and primary air passage 46 takes place in the shell 42, with the reacting fuel-air mixture from the burner 32 moving forwardly in the processing chamber 28.

Positioned in the processing section 28 of the housing 18 are two more cylindrical shells, namely an intermediate shell 50 and an outermost shell 52. Both of the shells 50 and 52 are positioned in the housing 18, with the common center axis of both the shells 50 and 52 being longitudinally aligned and coincident with the center axis of the housing 18 and the innermost shell 42.

The intermediate shell 50 has its front and rear ends open, with the rear edge 54 of the inner shell 50 being positioned a short distance forwardly of the partition wall 26, so that the shell 50 forms with the partition wall 26 an annular passageway 56 which completely surrounds the shell 42. As will be described more fully hereinafter, this annular passageway 56 provides for the properly controlled inflow of the polluted air effluent as secondary air for the oxidation reaction taking place in the processing section 28. The forward circular edge 58 of the inner shell 50 is slightly to the rear of the center of the processing section 28 of the housing 18.

The rear circular edge 60 of the outermost shell 52 is located slightly to the rear of the middle portion of the intermediate shell 50, and the front end 62 of the shell 52 is located close to the housing front end wall 22. The rear end of the shell 52 is open, while the front end 62 is closed by a wall 64 having a layer of a refractory material 64a. The rear portion 66 of the outer shell 52 overlaps the forward portion of the inner shell 50, and the forward portion 67 of the shell 52 is forward of the front edge 58 of the inner shell 50. As will be described more fully hereinafter, the rear outer shell portion 66 forms with the inner shell 50 an annular passage 68 which provides for the inflow of effluent as tertiary air for the oxidation occurring in the section 28. The outer shell 52 is spaced moderately inwardly of the housing side wall 20 to define with the housing side wall 20 an outer annular passageway 70 which serves as an effluent heat exchange passageway.

The rear portion 66 of the outer shell 52 and the inner shell 50 are interconnected by a plurality of longitudinally aligned vanes 71 which are positioned in the annular passageway 68 and extend rearwardly to join to the partition wall 26. As is best illustrated in FIG. 3, these vanes 71 are moderately angled so that the effluent passing through the passageway 68 as tertiary air is given a swirling motion in a direction opposite to that imparted to the primary air by the vanes 48. As seen in FIG. 2, this swirling motion of the tertiary air or effluent is in a counterclockwise direction.

At the lower forward end of the housing 18, there is an effluent inlet duct 72 which is connected to the aforementioned effluent conduit 16. This duct 72 provides an effluent inlet passage 74 which carries the effluent into the forward end of the annular heat exchange passage 70. A discharge stack 76 is connected to the forward upper portion of the outer shell 52 and extends upwardly through the top forward portion of the housing 18 to terminate at an upper hooded exit opening 78, at which location the substantially pollution free gaseous discharge enters the atmosphere.

In operation, the effluent to be processed flows up the conduit 16 and into the incinerating apparatus 10 through the inlet passageway 74. As discussed previously herein, this effluent comprises air with various gaseous and/or particulate material, which in the case of a coffee roasting operation would be various organic compounds which are to be oxidized in the apparatus 10 to form essentially carbon dioxide and water which are discharged into the atmosphere. The effluent passing from the inlet passage 74 flows into the forward part of the passageway 70 upwardly and around the outer shell 52 and rearwardly in the passageway 70. This flow of effluent in the passageway 70 places the effluent in heat exchange relationship with the outer shell 52 so that the effluent becomes heated on its rearward path of travel. Additionally, this flow of effluent in the passage 70 provides a thermal barrier to prevent overheating of the housing side wall 20.

As the effluent reaches the rear portion of the passageway 70, a portion of this effluent passes through the annular inlet opening 56 as an inflow of secondary air. The rest of the effluent flows into the annular passageway 68 to provide an inflow of tertiary air. The cross sectional areas of the secondary inlet 56 and of the tertiary passage 68 are so arranged that about one half to one quarter of the total effluent passes into the secondary inlet as secondary air, with the rest of the effluent flowing through the tertiary inlet passageway 68. The effluent traveling through the passageway 68 is placed in heat exchange relationship with the inner shell 50 so as to further increase its temperature to aid in the combustion process, and also to cool intermediate shell 50. The vanes 71, in addition to imparting the swirling motion to the tertiary air flow provide additional heat exchange surface to enhance the heat exchange with the effluent in the passageway 68.

To describe the oxidation process which occurs in the apparatus 10, the total combustion area in the section 28 can be considered to be functionally divided into three combustion zones. The first combustion zone, designated 80a, is that area within the innermost shell 42 and a small area immediately forward of the shell 42. In this first combustion zone 80a, a portion of the fuel oil emitted from the nozzle 44 reacts with the primary air issuing from the primary air passageway 46 to provide an initial reacting air-fuel mixture traveling forwardly from the first zone 80a. The flow of primary air is controlled by suitable means, such as a damper 82, so that the rate of primary air flow is approximately half that needed to accomplish complete combustion of the fuel. Thus in the primary zone the air-fuel mixture is fuel rich, with unreacted fuel passing from the first combustion zone.

The second combustion zone can be considered as being located in the area within the forward portion of the intermediate shell 50, and is generally designated 80b. In this zone 80b, the flaming air-fuel mixture from the zone 80a expands outwardly to mix with the secondary flow of effluent that passes through the inlet 56 and forwardly within the inner shell 50. Thus in the zone 80b, there is further reaction of the fuel supplied from the burner nozzle 44, along with an intermixing and reacting of the pollutants of the effluent flowing in a secondary air. The amount of secondary air flowing through the secondary inlet passage and into the second combustion zone is approximately adequate to accomplish substantially complete combustion of the fuel. It was found that if the width of the passage 56 was made too small, there was incomplete combustion of the discharge passing out the stack 76. If the passage 56 was made too large, there was a tendency of the excess of air to cause a flame-out.

The third combustion zone 80c is that area generally enclosed by the forward portion 67 of the outer shell 52. When the reacting fuel-air mixture reaches this third combustion zone 80c, the greater percentage of the fuel from the burner 32 has already reacted, which is indicated by the presence of a flame front at the forward end of the second combustion zone 80b, the flame front being indicated at 84, which is its approximate location when natural gas is used as the fuel. However, when oil is used as the fuel, the flame front extends further into the third combustion zone 80c. There is the inflow of tertiary air from the passageway 68 into the third zone 80c. The swirling inflow of the tertiary air imparted by the vanes 71 is opposite to the swirling flow imparted to the primary air by the vanes 48. This enhances the turbulent mixing of the tertiary air with the reacting fuel-pollutant-air mixture moving from the second combustion zone 80b into the third combustion zone, 80c, which causes substantially complete oxidation of the pollutants in the tertiary air flow. The combustion products from the third combustion zone 80c pass upwardly through the stack 76 to be emitted from the stack discharge opening 78 into the ambient atmosphere as substantially pollution free exhaust.

For automatic operation of the apparatus 10, thermal sensors are placed in the lower portion of the exhaust stack 76 and connected to the computerized controls of the burner 32. This can be done in a manner such that when the temperature in the stack 76 rises moderately above a predetermined level, the flow of fuel through the nozzle 44 can be reduced. In the event that the temperature in the stack 76 rises to what is considered a danger level, the controls are caused to shut off the flow of fuel entirely to stop operation of the apparatus 10.

EXAMPLE I

An incinerating apparatus was actually constructed substantially as shown in the accompanying drawing. The over all length of the apparatus was 109 ¼ inches, and the width, 64 inches. The length of the control section was 36 inches, and the length of the processing section was 73 ¼ inches. The inside diameter of the effluent inlet duct was 18 inches; the inside diameter of the exhaust stack was 24 inches; the over all length of the intermediate shell was 48 inches; the width dimension of the annular tertiary passage was 5 inches; and the width dimension of the annular secondary inlet opening was 2 inches.

The apparatus so constructed was installed on the roof of a coffee processing plant, substantially as shown in FIG. 1, and the effluent from two coffee roasting ovens was directed into the apparatus 10 through the inlet duct. The total flow of effluent through the inlet duct was at a rate of 3,000 cubic feet per minute at 102° F., this temperature being taken at location "A", as illustrated in FIG. 2. The temperature of the effluent at location "B" at the entrace of the tertiary passageway 392° F. At location "C" at the exit of the tertiary passageway, the temperature of the effluent had risen to a level of 586° F. At a location "D" in the third combustion zone, the temperature was 1268° F. In taking this temperature measurement, the sensing probe was moved transversely toward the sides of the third combustion zone, and it was found that the temperature was substantially uniform through all parts of the transverse plane. At a location at the wall 64, indicated at "E", the temperature was 1021° F. At location "F", in the stack six inches above the top surface of the housing, the temperature was 1268° F., while the temperature at the surface of the stack at "G" was 1188° F. At a location inside the stack five feet up from the top of the housing, the temperature was 1047° F.

Prior to installation of the apparatus 10, the effluent from the coffee roasting ovens were in violation of the local air pollution code. This effluent was in the form of a dark smoke that errupted from the stack during certain periods of operation. A heavy foul odor was over the entire area adjacent the processing plant. Subsequent to the installation and operation of the incinerating apparatus of the present invention, the discharge from the stack of the apparatus was analyzed by a comparison by means of the Ringelman Smoke Chart which compares the density of columns of smoke rising from stacks with shades of grey, varying by fine equal steps between white and black. The exhaust from the apparatus had a Ringelman number of zero (0), which indicates a reduction of visible emmissions of essentially 100%.

Another measure of pollution removal is simply by human detection of such pollution through the sense of smell. Humans have the ability to respond to thousands of distinct odor stimulii and to detect air pollutants which may originate from sources at relatively great distances. Such odors can be detected in concentrations of gaseous materials as low as one part of contaminant per billion parts of air. Hence the human nose has often been characterized as one of the best known devices for gas analysis. After installation of the incinerating apparatus as described above, there was not detectable odor in the area immediately adjacent the processing plant. Even at the very top of the stack where the effluent gases were being emitted, there was still no detectable odor. Thus the apparatus had removed essentially 100% of the odor causing organic compounds produced in the coffee roasting operation.

As a further test of the effectiveness of the apparatus, samples of the effluent passing into the apparatus were gathered, and samples of the exhaust from the apparatus were also gathered. The equipment used for such sampling was the same as described in the Source Sampling Manual, by M. F. Rivera, Metropolitan Dade County, Miami, Fla., 1968. The samples were collected from the quadrant of the stack which had the highest gas velocity as determined by measurement prior to sampling. The samples were collected in an impringer which was packed in crushed dry ice. All of the volatile components were removed from the stack gases and collected in this manner.

Much of the samples which were collected in the above manner, both before and after incineration, were water. The water comes primarily from a quenching process in the roasting ovens.

The first step in the analysis of the collected stack gases was to separate the water from the organic components. This was done by attaching the impringer, containing the sample, to a vacuum train. After attachment to the vacuum train, the sample was allowed to come to room temperature. All gases which came from the sample were first passed through a 12 inch tube of Drierite (indicating calcium chloride, $C_aCl_2$ to remove all of the water from the sample. The next step, was to pass the gases through a glass tube immersed in a dry ice-acetone bath. Thus, all of the volatile components in the sample, except for water which was removed earlier in the train, were collected in the tube which was at the dry ice-acetone bath temperature.

The components collected in the dry ice-acetone bath were sealed in the tube and weighed. From the weight of the pre-weighed tube, the weight of the components collected in this way could be determined. Included in these volatile components are the organic compounds such as, aldehydes, ketones, esters, and acids which were mentioned previously herein. From the calculations on the data derived in the above manner, it was determined that the above described apparatus effectively removed 81.9% of all the volatile components present in the stack effluent, when the unit was operating at 1200° F. (650° C.), which is about 50° F. to 100° F. below optimum operating temperature for the particular application. Since 1200° F. (650° C.), is the minimum temperature that complete oxidation of all organic components should take place, it can reasonably be surmised that the removal efficiency should be increased to essentially 100% when the temperature is increased to 1300° F. (700° C.).

What is claimed is:
1. A process for incinerating a polluted air effluent, said process comprising:
    a. directing fuel and unpolluted primary air as a reacting fuel-air mixture in a downstream direction axially through a confined generally cylindrical combustion area comprising a first combustion zone, a second intermediate combustion zone coaxially downstream of said first combustion zone and a third final combustion zone coaxially downstream of said second combustion zone,
    b. directing a portion of the polluted air effluent into said intermediate combustion zone in a flow pattern annularly surrounding and flowing generally coaxially with the combustion products emerging from said first combustion zone,
    c. directing additional polluted air effluent into said final combustion zone in a flow pattern annularly surrounding and flowing generally coaxially with the combustion products emerging from said intermediate combustion zone, and d. discharging the combustion products exhausting from said third combustion zone to the atmosphere.

2. The process as recited in claim 1, wherein the flow of primary air into the first combustion zone swirls in a first direction around the axis of said combustion zones, and the flow of polluted effluent into the third combustion zone swirls in a reverse direction around said axis.

3. The process as recited in claim 1, further comprising initially channelling said polluted air effluent in a confined, generally annular flow pattern through a generally cylindrical first heat exchange passageway arranged around said second and third combustion zones so as to place said effluent in heat exchange relationship with said combustion zones and heat said effluent prior to introduction thereof to the combustion reaction, the flow path of said effluent in said first heat exchange passageway being generally coaxial with and in a direction opposite to the flow of gases through said combustion zones.

4. The process as recited in claim 3, wherein a portion of said polluted air effluent, after passage through said first heat exchange passageway, is passed through a second generally annular heat exchange passageway immediately surrounding the downstream portion of said second conbustion zone so as to place the effluent portion flowing into said third combustion zone into heat exchange relationship with downstream portion of said second combustion zone.

5. The process as recited in claim 1, wherein the fuel and primary air are directed into said first combustion zone at rates maintaining the products of combustion emerging therefrom fuel rich, and the flow of polluted effluent into said second combustion zone is maintained at a rate sufficient to react with most of the unreacted fuel therein.

6. The process as recited in claim 5, wherein approximately one-quarter to one-half of the polluted effluent being incinerated is directed into said second combustion zone, and approximately three-quarters to one-half of the remaining effluent is directed into said third combustion zone.

* * * * *